(12) United States Patent
Poltorak

(10) Patent No.: US 9,838,484 B2
(45) Date of Patent: *Dec. 5, 2017

(54) RELEVANCE ESTIMATION AND ACTIONS BASED THEREON

(71) Applicant: Alexander I. Poltorak, Monsey, NY (US)

(72) Inventor: Alexander I. Poltorak, Monsey, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/289,089

(22) Filed: Oct. 7, 2016

(65) Prior Publication Data
US 2017/0026476 A1    Jan. 26, 2017

Related U.S. Application Data

(63) Continuation of application No. 14/562,615, filed on Dec. 5, 2014, now Pat. No. 9,485,313, which is a continuation of application No. 13/658,516, filed on Oct. 23, 2012, now Pat. No. 8,930,385.

(60) Provisional application No. 61/554,778, filed on Nov. 2, 2011.

(51) Int. Cl.
| | |
|---|---|
| *G06F 17/30* | (2006.01) |
| *H04L 29/08* | (2006.01) |
| *G06Q 30/00* | (2012.01) |
| *G06Q 30/02* | (2012.01) |
| *G06Q 50/00* | (2012.01) |

(52) U.S. Cl.
CPC ........ *H04L 67/18* (2013.01); *G06F 17/30283* (2013.01); *G06F 17/30592* (2013.01); *G06F 17/30604* (2013.01); *G06F 17/30864* (2013.01); *G06F 17/30867* (2013.01); *G06Q 30/00* (2013.01); *G06Q 30/0258* (2013.01); *G06Q 50/01* (2013.01); *H04L 67/306* (2013.01)

(58) Field of Classification Search
USPC .......................................... 707/758, 748, 831
See application file for complete search history.

(56) References Cited

U.S. PATENT DOCUMENTS

| | | | | |
|---|---|---|---|---|
| 6,735,568 | B1 * | 5/2004 | Buckwalter | G06Q 30/02 705/319 |
| 8,060,451 | B2 * | 11/2011 | Degeratu | G06Q 10/06 705/319 |
| 8,661,081 | B2 * | 2/2014 | Rahnama | G06Q 10/10 705/319 |
| 2002/0075331 | A1 * | 6/2002 | Orbanes | G06F 3/0346 715/854 |
| 2002/0083034 | A1 * | 6/2002 | Orbanes | G06F 3/0346 |
| 2002/0085035 | A1 * | 7/2002 | Orbanes | G06F 3/0481 715/764 |

(Continued)

*Primary Examiner* — Cam-Linh Nguyen
(74) *Attorney, Agent, or Firm* — Anatoly S. Weiser, Esq.; TechLaw LLP

(57) ABSTRACT

Computer-based systems, methods, and articles of manufacture are disclosed. In a social network embodiment, information regarding a first user is obtained and formed into a first dataset. Conceptual spaces are selected for the first user, and the first user's location is determined in the spaces. Distances between the first user and other users and their datasets are computed in the selected conceptual spaces. Actions are taken based on the distances, such as including or excluding the other users from a friends list of the first user.

27 Claims, 4 Drawing Sheets

(56) References Cited

U.S. PATENT DOCUMENTS

| | | | | |
|---|---|---|---|---|
| 2002/0109680 A1* | 8/2002 | Orbanes | G06F 3/0346 | 345/418 |
| 2007/0156664 A1* | 7/2007 | Norton | G06Q 10/10 | |
| 2009/0099998 A1* | 4/2009 | Verspoor | G06N 99/005 | 706/55 |
| 2010/0132049 A1* | 5/2010 | Vernal | G06F 21/6245 | 726/27 |
| 2010/0257023 A1* | 10/2010 | Kendall | G06Q 30/02 | 705/14.46 |
| 2011/0016137 A1* | 1/2011 | Goroshevsky | G06Q 30/02 | 707/758 |
| 2011/0093346 A1* | 4/2011 | Lunt | G06F 17/30864 | 705/14.71 |
| 2011/0093498 A1* | 4/2011 | Lunt | G06F 17/30864 | 707/769 |
| 2011/0126132 A1* | 5/2011 | Anderson | G06Q 10/10 | 715/758 |
| 2011/0145050 A1* | 6/2011 | Gross | G06Q 10/10 | 705/14.25 |
| 2011/0161838 A1* | 6/2011 | Kang | G06Q 10/06 | 715/757 |
| 2011/0173316 A1* | 7/2011 | Moromisato | G06Q 10/10 | 709/224 |
| 2011/0250575 A1* | 10/2011 | Kalvachev | G06Q 30/02 | 434/236 |
| 2012/0042282 A1* | 2/2012 | Wong | G06F 17/30994 | 715/811 |
| 2012/0047002 A1* | 2/2012 | Patel | G06Q 30/0207 | 705/14.1 |
| 2012/0066306 A1* | 3/2012 | Leacock | H04L 51/043 | 709/204 |
| 2012/0154513 A1* | 6/2012 | Su | H04L 12/1827 | 348/14.07 |
| 2012/0324001 A1* | 12/2012 | Leacock | H04L 51/043 | 709/204 |

\* cited by examiner

RELEVANCE ESTIMATION AND ACTIONS BASED THEREON

CROSS-REFERENCE TO RELATED APPLICATION

This application is a continuation of and claims priority from U.S. patent application Ser. No. 14/562,615, entitled RELEVANCE ESTIMATION AND ACTIONS BASED THEREON, filed on Dec. 5, 2014, now allowed; which claims priority from U.S. patent application Ser. No. 13/658,516, entitled RELEVANCE ESTIMATION AND ACTIONS BASED THEREON, filed on Oct. 23, 2012, now U.S. Pat. No. 8,930,385, issued Jan. 6, 2015; which claims priority from U.S. provisional patent application Ser. No. 61/554,778, entitled APPARATUS, METHODS, AND ARTICLES OF MANUFACTURE FOR RELEVANCE ESTIMATION AND ACTIONS BASED THEREON, filed on Nov. 2, 2011. Each of the above-referenced patent documents is hereby incorporated by reference in its entirety as if fully set forth herein, including text, figures, claims, tables, and computer program listing appendices (if present), and all other matter therein.

This application is also related to U.S. patent application Ser. No. 14/656,625, entitled RELEVANCE ESTIMATION AND ACTIONS BASED THEREON, filed Mar. 12, 2015.

FIELD

The present description relates generally to estimation/determination of relevance or relatedness of datasets and actions based on the resulting estimates/determinations. In selected embodiments, the present description relates to social networking and virtual reality.

BACKGROUND

Estimating relatedness of various data sets is useful in many applications. In social networking, for example, estimating potential interest of a first user in another user may be useful when selecting users to suggest as potential "friends" to the first user. It is also useful in selecting advertising to present (render) to the particular user. Similarly, a virtual space can be defined so that it describes a given number of qualities. For example, a virtual reality space can be defined so that the distance between avatars represents similarity of their qualities rather than the distance in the "physical" space as it appears on a computer screen or other display. There are other uses for estimating relevance/relatedness as well.

Therefore, it is desirable to facilitate the process of estimating relatedness of real or notional objects, and taking action based on the resulting estimates.

SUMMARY

A need thus exists for improved ways to make estimations of relevance/relatedness, and to act in response to the estimations.

Embodiments of the present invention are directed to methods, apparatus, and articles of manufacture that satisfy one or more of these needs. Some described embodiments are used to define a distance in a virtual reality or a social network between objects, concepts, and/or other datasets.

Selected embodiments disclosed herein include a computer-implemented method. In accordance with the method, a first dataset is formed from information submitted for a first entity. The method also includes selecting one or more conceptual spaces for the first entity. The method additionally includes determining one or more locations of the first entity in the one or more conceptual spaces, at least one location of the one or more locations of the first entity per each conceptual space of the one or more conceptual spaces. The method further includes computing one or more distances from the first entity to a second entity in the one or more conceptual spaces, at least one distance of the one or more distances per conceptual space of the one or more conceptual spaces, the second entity having a second dataset formed based on information regarding the second entity. The method further includes testing each distance of the one or more distances under one or more criteria. The method further includes rendering (e.g., displaying) information regarding relatedness of the first entity and the second entity, in response to the step of testing.

These and other features and aspects of the present invention will be better understood with reference to the following description, drawings, and appended claims.

DETAILED DESCRIPTION

Figure 1:
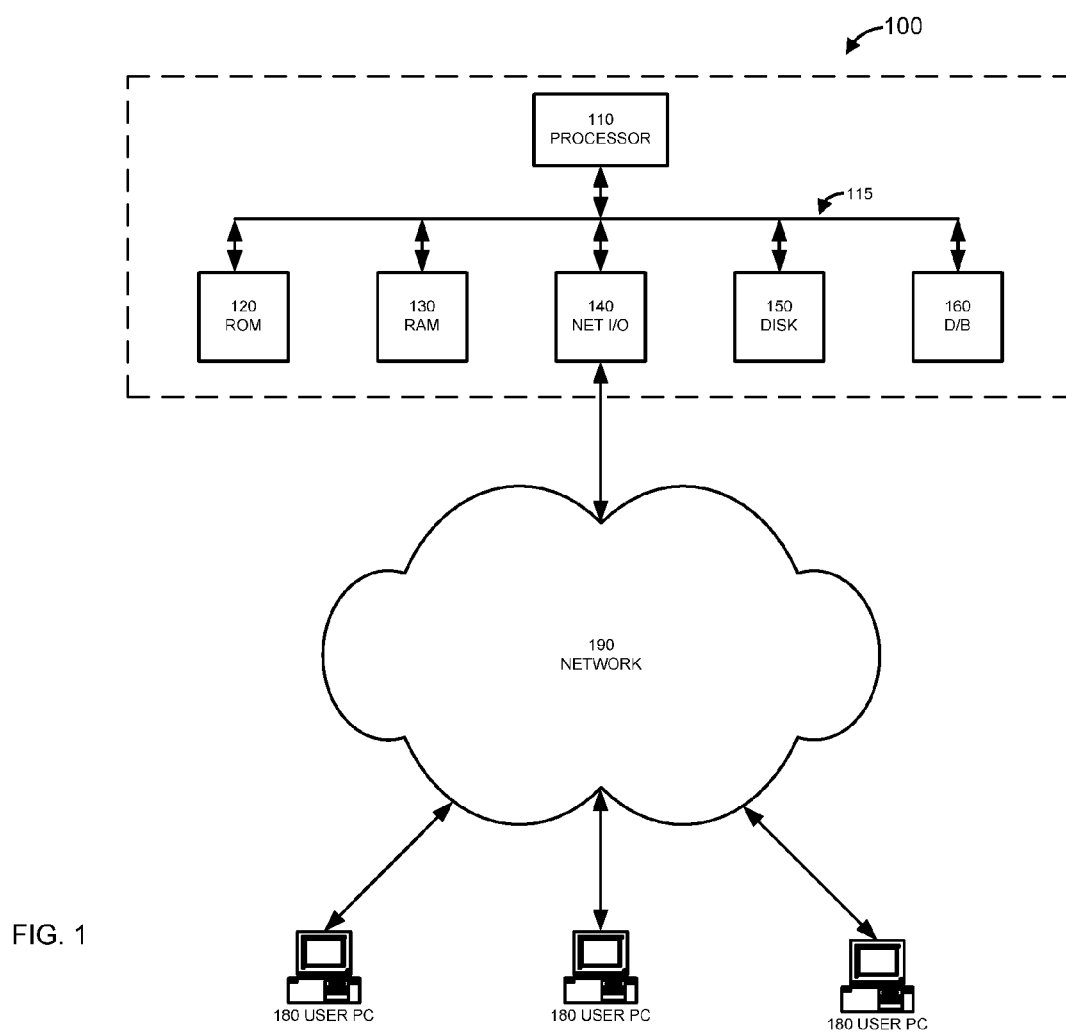
FIG. 1 illustrates selected components of a computer-based system configured to perform steps of a method in accordance with an embodiment described in this document.

In this document, the words "embodiment," "variant," "example," and similar expressions refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar expressions and phrases are used to indicate one of a number of different possible embodiments. The number of possible embodiments is not necessarily limited to two or any other quantity. Characterization of an item as "exemplary" means that the item is used as an example. Such characterization of an embodiment does not necessarily mean that the embodiment is a preferred embodiment; the embodiment may but need not be a currently preferred embodiment. The embodiments are described for illustration purposes and are not necessarily strictly limiting.

The words "couple," "connect," and similar expressions with their inflectional morphemes do not necessarily import an immediate or direct connection, but include connections through mediate elements within their meaning, unless otherwise specified or inherently required.

"Contiguous" and its inflectional morphemes are used to describe a dimension that is not entirely discrete; the dimension may be entirely continuous (i.e., the value of the dimension's variable is allowed to assume any number), or continuous in one or more intervals (i.e., the value of the dimension's variable is allowed to assume any number within the one or more intervals). A contiguous dimension may have one or more discrete values in addition to the one or more continuous intervals. A contiguous interval may be bounded on one side only, or bounded on one side and unbounded on the other side.

Other and further definitions and clarifications of definitions may be found throughout this document.

A "user" may be a person, a business entity, or another organization.

A "dataset" is a collection of information about a particular user, avatar, place, event, business transaction, or actual/potential occurrence. For a person, generation of a dataset is described below. An advertisement may have a dataset associated with it, including, for example, descriptions of a product or service, and demographic data and personality traits of those person who are likely to be interested in one or more of the products/services marketed through the advertisement.

Reference will now be made in detail to several embodiments and accompanying drawings. Same reference numerals are used in the drawings and the description to refer to the same apparatus elements and method steps. The drawings are in simplified form, not to scale, and omit apparatus elements and method steps that can be added to the described apparatus and methods, while including certain optional elements and steps.

In a physical world, all objects, including people, exist in physical space and have specific place in the physical space. A distance between two objects is calculated as the distance in the space between two points corresponding to the respective positions of the objects. In a three-dimensional Euclidean space, for example, the distance $\Delta S$ between two points $A(x1, y1, z1)$ and $B(x2, y2, z2)$ is defined as a solution to the following equation:

$$\Delta S^2 = \Delta x^2 + \Delta y^2 + \Delta z^2, \quad (1.1)$$

where $\Delta S = S_A - S_b$; $\Delta x = x_1 - x_2$; $\Delta y = y_1 - y_2$; and $\Delta z = z_1 - z_2$. In a more general non-Euclidian metric space, the geometry is defined by the metric $$ds^2 = g_{ij} dx^i dx_j, \quad (1.2)$$

where $g_{ik}$ is a metric tensor. In a more general non-Euclidian metric space, the distance between point A and point B is defined as $$S = \int_A^B ds = \int_A^B (g_{ij} dx^i dx^j)^{\frac{1}{2}}. \quad (1.3)$$

A mathematical concept of space need not be confined to the notion of physical space. In mechanics, for example, so called configurational space for N particles is defined as 3N-dimensional space, which represents all possible positions of all particles. A phase space is a space, in which all possible states of a system are represented, wherein each possible state corresponds to a unique point in the phase space. In mechanics, a phase space may consist of all possible positions and momentum values of all particles. A phase space for N particles is defined as 6N-dimensional space wherein each particle has six coordinates: three spacial coordinates—$x_1$, $x_2$, $x_3$, and three components of momentum—$p_1$, $p_2$, $p_3$.

An abstract mathematical space can be used to describe any number of variables. For example, a logical variable P that can have only two values, True or False, can be described as a 1-dimensional discrete space consisting of two points: $x_1$=True and $x_2$=False. In such space, we can define the distance S between two logical values P and Q as S=0, if A=B, and S=∞, if B=$\overline{A}$ (not A). In other works, two concepts occupy the same space in a conceptual space if they are identical, or they are infinitely far from each other if they are opposites. Such conceptual space need not be discrete. A contiguous space may represent a concept that changes contiguously. In such space the more two concepts are alike or similar, the closer they are in their conceptual space. The more dissimilar they are, the further apart they are from each other in such a space.

Figure 3:
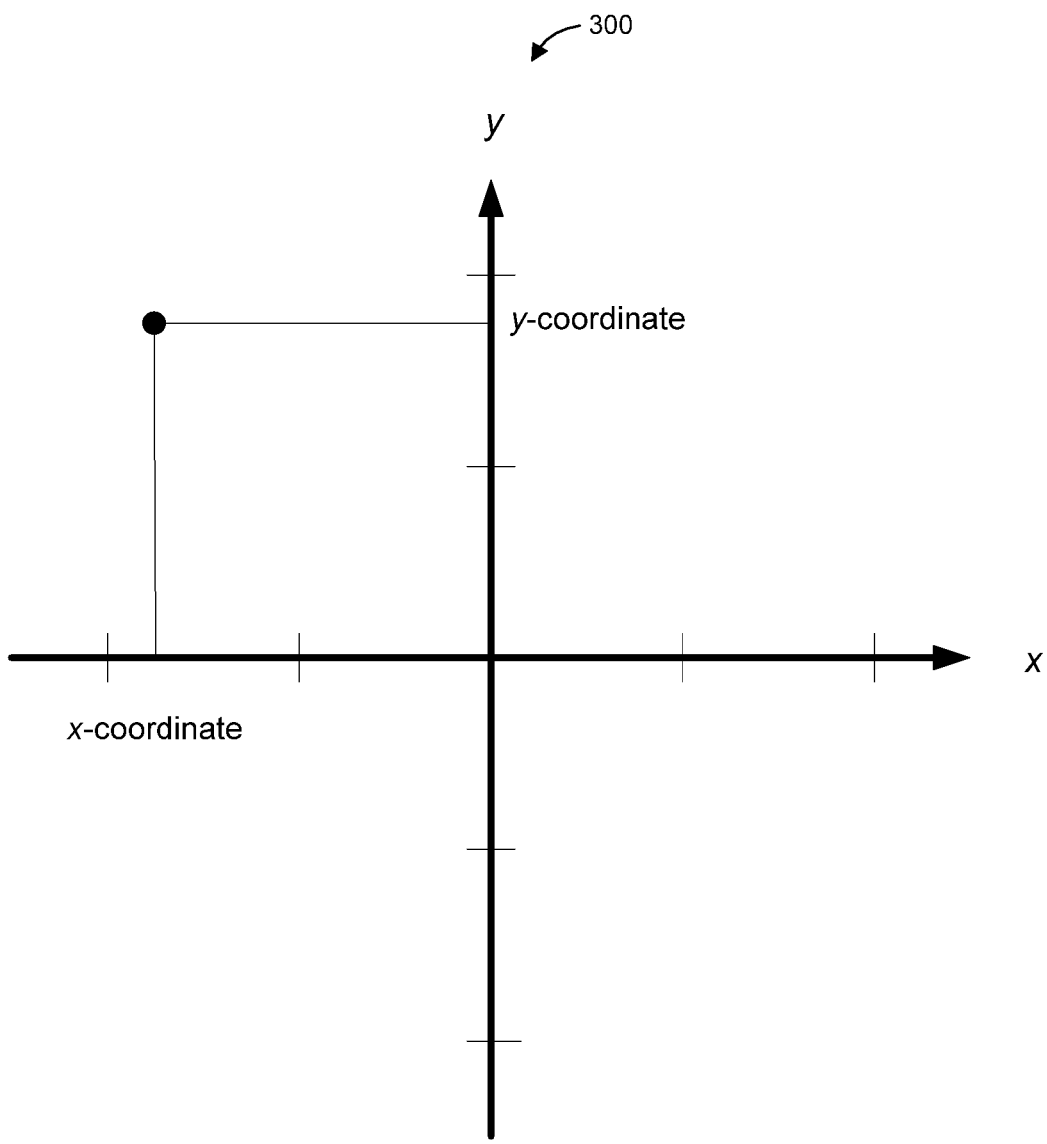
FIG. 3 illustrates selected aspects of a two-dimensional conceptual space.
Figure 4:
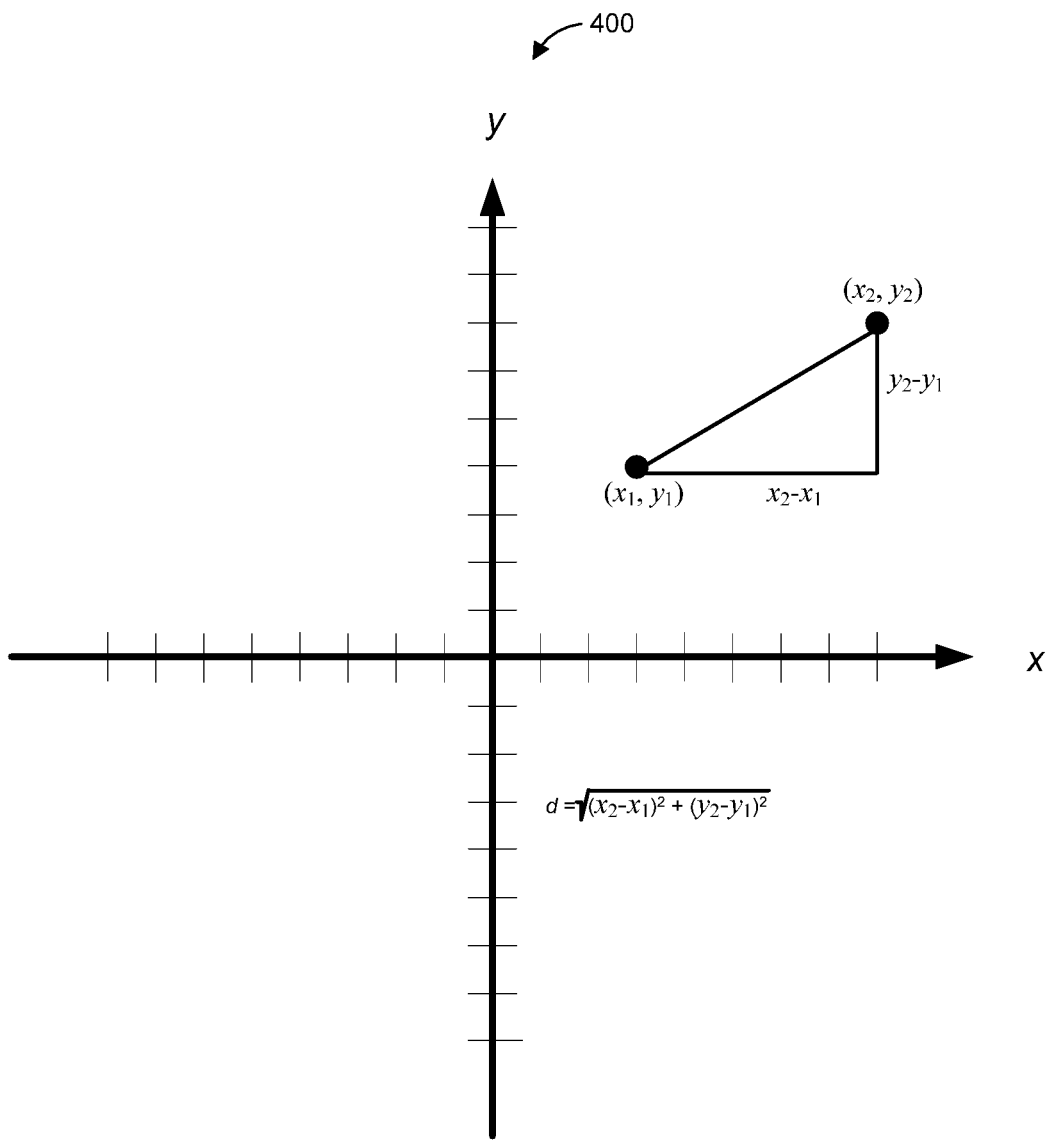
FIG. 4 illustrates selected aspects of a conceptual distance in a two-dimensional conceptual space.

Let us define, for example, a two-dimensional conceptual space (x, y) occupied by objects having two qualities—X and Y—wherein dimension x represents the quality of X and dimension y represents the quality Y, as shown in FIG. 3. If the conceptual space a "musical" space, the pair of qualities X and Y may represent, respectively, frequency (measured in Hertz, for example) and volume (measured in Decibels, for example). Two notes of the same frequency and the same volume will occupy the same point in this "musical" space. The "distance" $\Delta S$ between note A and note B may be defined as a solution to $\Delta S$ from the following equation:

$$\Delta S^2 = \Delta x^2 + \Delta y^2, \quad (1.4)$$

where $\Delta x = x_2 - x_1$ is the difference in frequency and $\Delta y = y_2 - y_1$ is the difference in volume. See FIG. 4.

In a "political" space, for example, the qualities X and Y may represent different political views. Say, X may represent views about fiscal policy and Y may represent views about social policies. Two people having the same views on both issues will occupy the same point in such "political" space. The distance between political views of two people may be calculated as before, from the equation $\Delta S^2 = \Delta x^2 + \Delta y^2$.

We can similarly build a 3-D "color" space, where the three coordinates (x, y, z) represent three primary colors, say x for red, y for green and z for yellow. Two points in this space will coincide if they have the same color ingredients, i.e., they will have the same color.

A conceptual space may have any number of dimensions representing a given number of qualities that objects occupying such space possess. Such spaces may be contiguous or discrete. Indeed, such spaces can be contiguous in one or more dimensions, and discrete in one or more other dimensions.

A simple topological space usually has dimensions represented by a natural number. Thus, a well-familiar physical space has dimension 3. The surface of a sphere has a dimension of 2. The Minkowski spacetime of Special Theory of Relativity has a dimension of 4. The phase space in mechanics may have a dimension of 6N. In mathematics, there are spaces defined with dimensions which are represented by fractional numbers. A Housdorf dimension does not have to be whole. One can interpret such a dimension having a whole part n and a fractional part p as a space whose dimension is uncertain and may be n or n+1 with the probability 0≤p≤1.

Virtual spaces known today attempt to emulate physical reality. Virtual worlds are 2-D or 3-D virtual spaces that look like physical worlds wherein avatars and other objects can move around in a virtual space. Online games allow players to build virtual worlds, such as a virtual store or a virtual city. Virtual space, however, is essentially a conceptual space and can represent conceptual reality, rather than merely mimicking physical reality, however whimsical. A virtual space can be defined so that it describes a given number of qualities. For example, a virtual reality space can be defined so that the distance between two avatars represents similarity of their qualities rather than the distance in the simulated "physical" space as it appears on a computer screen or other display.

Social networks currently known may define rigid groups (such as Face Book or LinkedIn) or circles (Google+) to which each member of the network either belongs or does not belong. A social network, however, can be constructed using a conceptual space wherein the "distance" in the network between people is defined by their relationship and the affinity of their views and interests. For example, a multi-dimensional conceptual space can be defined wherein one dimension is family relationship (so that close relatives will be closer to each other than distant relatives); another dimension can represent professional occupation (so that the closer the professional occupations of two people are, the closer the two people will appear in this dimension of the conceptual space); yet another dimension can represent political views (the closer the political views of members, the closer they are in the political dimension of this space); still another dimension can represent age; yet another discrete dimension can represent gender; still another dimension can represent religious views; yet another dimension can represent the frequency of communications between members; other dimensions can represent various hobbies, interests, and other affinities. The physical proximity can be one of the dimensions in such conceptual space. The degree of separation (such as in LinkedIn, immediate friends—$1^{st}$ degree, friends of friends—2d degree, etc.) can be another discrete dimension in such conceptual space. In such space, people with similar views, occupation, hobbies, age, etc., may occupy locations in close proximity to each other, thereby creating a conceptual neighborhood.

People tend to socialize with their family members, neighbors, classmates, colleagues, relatives, friends, people of the same nationality and/or religion, and people with similar views and interests. A social network constructed as a conceptual space groups people together by their closeness in all such categories, or in a subset of the categories. Such social network can represent the real human interaction in its full spectrum and richness much more natural than existing social networks.

Any member who likes another member can "drag" this member closer overriding the distance calculated by the algorithm based on a given set of characteristics of these two members. One member can bring one member closer or push the member further, overriding the calculated positions. This can be done, for example, visually by dragging an avatar of the member in a virtual space to or from one's own position, or, for example, by selecting a member of the social network and clicking on "Like" or "Dislike" (or similar) buttons and specifying the degree of similarity/attraction or dissimilarity/repulsion towards that person on a given scale.

The distance between network members can be used as a proxy for the degree of influence of one member on another and used, for example, in selecting advertisements for the one member.

FIG. 1 is a simplified block diagram representation of a computer-based exemplary system 100 configured in accordance with selected aspects of the present description. As shown in FIG. 1, the system 100 is coupled to user computers 180 via a communication network 190. FIG. 1 does not show many hardware and software modules, and omits several physical and logical connections. The system 100 can be implemented as a special purpose data processor, a general-purpose computer, a computer system, or a group of networked computers or computer systems configured to perform the steps of methods described throughout this document, either alone or in conjunction with other elements such as the user computers 180. In some embodiments, the system 100 is built on a personal computer platform, such as a Wintel PC or a Mac computer. The personal computer may be a desktop or a notebook computer.

The system 100 includes a processor 110, read only memory (ROM) module 120, random access memory (RAM) module 130, network interface 140, a mass storage device 150, and a database 160. These components are coupled together by a bus 115. In the illustrated embodiment, the processor 110 is a microprocessor, and the mass storage device 150 is a magnetic disk drive. The mass storage device 150 and each of the memory modules 120 and 130 are connected to the processor 110 to allow the processor 110 to write data into and read data from these storage and memory devices. The network interface 140 couples the processor 110 to the network 190, for example, the Internet. The nature of the network 190 and of the devices that may be interposed between the system 100 and the network 190 determine the kind of network interface 140 used in the system 100. In some embodiments, for example, the network interface 140 is an Ethernet interface that connects the system 100 to a local area network, which, in turn, connects to the Internet.

The database 160 is used for organizing and storing data that may be needed or desired in performing the method steps described in this document. The database 160 may be a physically separate system coupled to the processor 110, as illustrated in FIG. 1. In one alternative embodiment, the processor 110 and the mass storage device 150 are configured to perform the functions of the database 160.

The processor 110 reads and executes program code instructions stored in the ROM module 120. Under control of the program code, the processor 110 configures the system 100 to perform all or some of the steps of the methods described below. In addition to the ROM module 120, the program code instructions may be embodied in machine-readable storage media, such as hard drives, floppy diskettes, CD-ROMs, DVDs, and similar devices that can store the instructions permanently or temporarily, in a non-transitory manner. The program code can also be transmitted over a transmission medium, for example, over electrical wiring or cabling, through optical fiber, wirelessly, or by any other form of physical transmission. The transmission can take place over a dedicated link between telecommunication devices, or through a wide- or local-area network, such as the Internet, an intranet, extranet, or any other kind of public or private network. In one embodiment, the program code is downloaded to the system 100 through the network interface 140.

The system 100 may implement a social network server or a virtual reality server.

Figure 2:
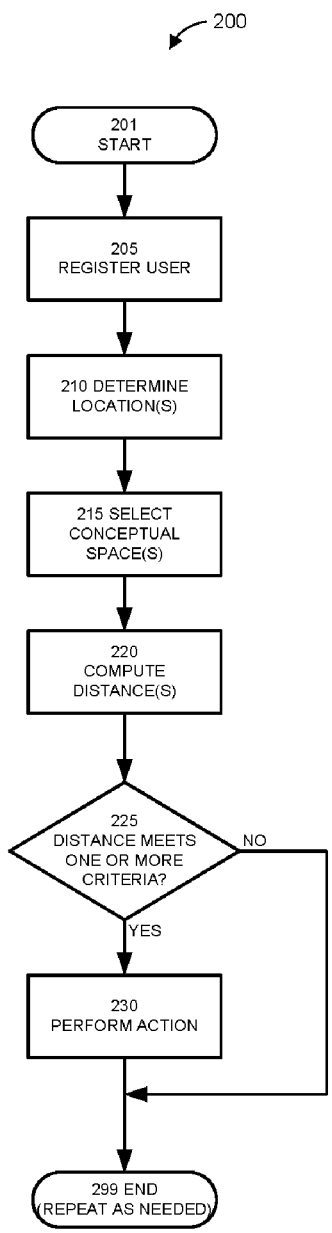
FIG. 2 illustrates selected steps of a method for making estimations of relevance/relatedness and acting based on the estimations, in accordance with an embodiment disclosed in this document.

FIG. 2 is a process flow diagram illustrating selected steps and decision blocks of a process 200 for determining the degree of potential interest of a first user in a second user. The users may be at their respective user computers 180. The process 200 may be performed, in whole or in part, by the system 100 of FIG. 1, for example, in communication with the user computers 180. The process 200 may also be performed by various other systems.

Although the process steps and decisions are described serially, certain steps and decisions may be performed by separate elements in conjunction or in parallel, asynchronously or synchronously, in a pipelined manner, or otherwise. There is no particular requirement that the steps and decisions be performed in the same order in which this description lists them, except where a specific order is inherently required, explicitly indicated, or is otherwise made clear from the context. Furthermore, not every illustrated step and decision block may be required in every embodiment in accordance with the invention, while some steps and decision blocks that have not been specifically illustrated, may be desirable or necessary in some embodiments in accordance with the invention.

At flow point 201, the system 100 is properly configured and ready to perform the steps of the process 200. In step 205, the system registers a user, generating a corresponding dataset. (In variants, the system obtains a dataset of a different entity, and the steps below are the same or substantially the same mutatis mutandis as applicable to such entity.) The user may be at one of the user computers 180 connected to the system 100 via the network 190, as is illustrated in FIG. 1. Registration entails, for example, obtaining the user's name, postal address, email address, twitter handle, telephone number, and demographic information (e.g., age, gender, physical location, income, race), and personality profile (e.g., interests, hobbies, likes, dislikes, self-evaluation of the user's personality), communication device ownership and communication device preferences. The user may be given an option to attach relative weights to the user's different interests, hobbies, likes, dislikes, and other attributes. Questions designed to elicit information for determining a psychological profile of the user may also be offered to the user. Legally mandated or desirable disclosures, disclaimers, and terms of the agreement between the operator of the system 100 and the user may also be presented to the user at the time of registration. The disclosures and disclaimers may vary depending on the physical site of the user, in order to tailor these documents to the requirements of the user's country, state, or another jurisdiction. The responses received from the user and records indicating which documents have been provided to the user may be stored in the database 160.

In step 210, the user's "location" is determined in one or more conceptual spaces; the dimensions of each of the conceptual spaces correspond to all or some of the data provided by the user, which may include the weights the user assigned to one or more of the dimensions (interests, hobbies, etc.); the weights can be applied linearly or in some other fashion. When applied linearly, a weight of w can double the distance (say Δx) in the dimension to which the weight corresponds. The weights may be assigned by the users explicitly (e.g., 1, 2, 3, etc.), through a translation algorithm applied to words signifying importance or affection (e.g., "don't care much"=0.5, "neutral"=1, "important"=2, "very important"=3, "can't live without"=4, etc.), based on data regarding the user's internet activity on the site of the system 100 or other sites (previous searches, web pages visited, links selected, advertisements responded to, etc.), or through application of results of a psychological profile applied to answers provided by the user during registration or otherwise. The psychological profile may be a known profile, such as a Myers-Briggs Type Indicator profile or a Wilson Learning Systems profile, or another possibly custom profiling technique. Additional dimensions may also be selected and weighted based on other data, for example, based on data regarding the user's internet activity on the site of the system 100 or other sites (previous searches, web pages visited, links selected, advertisements responded to, etc.), or through application of results of the psychological profile applied to answers provided by the user during registration or otherwise.

It should be noted that some conceptual spaces may not have a dimension corresponding to a particular data point provided by the user; and the user may not have provided data for one or more dimensions of a particular conceptual space. When a conceptual space has one or more dimensions in which the user's coordinate is not known, the user's "location" in such a space may be considered to correspond to the coordinates in the other (known) dimensions, ignoring the unknown coordinates.

In step 215, one or more of the conceptual spaces in which the distances have been determined are selected for the user. Note that this step may in fact precede the step 210, so that the conceptual spaces are selected before the locations are determined.

In step 220, the user's distance(s) from one or more other users (or more generally from other datasets) is (or are, as the case may be) computed in one or more of the conceptual spaces. Distance computation may be static or dynamic. When dynamically computed, the distance in a particular conceptual space may depend on dynamically changing information, such as the user's internet activity (searches etc.), internet activity of another user (or other dataset) to which the distance is computed, and on other dynamically varying conditions. The dynamically varying conditions may include financial data (stock markets indices, bond markets indices, individual security quotations, commodity indices, individual commodities, real estate indices, volatility indicators, released survey data, and similar financial data), breaking news items, weather (local or at predetermined locations), sports events and competition results, price changes of consumer products/services, geographic location of the user (which may be dynamically obtainable from the user's portable communication device), geographic location of another user or another entity, and similar live or recent data.

It should be noted that the distance between two users may be the same in both directions or perspectives. The distance may also vary depending on the perspective. For example, the distance between a first use and a second user measured from the first user's perspective, may differ from the distance between the user's measured from the second user's perspective.

In decision block 225, a distance of the user/dataset from another user/dataset is evaluated using (tested against) one or more criteria. If the one or more criteria are met, an action is performed in step 230.

In the social network context, for example, a simple criteria may be a first limit value: if the distance is not greater than the first limit value, for example, the distance meets the criteria, and the user/dataset from which perspective the distance was measured is offered the other user/dataset as a potential object for inclusion in the first user's group of interest, such as a group of the first user's friends. The second user may also be automatically included in the group if the criteria are met. Similarly, an advertisement may be targeted to the first user if the distance from the first user's perspective meets one or more criteria, or if the distance from the advertisement's dataset perspective meets the one or more criteria.

More than one distance may be evaluated/tested in the decision block 225, and more than one set of criteria may be used in the decision block 225.

The one or more criteria by which a distance is evaluated may depend (1) on a particular user/dataset from whose perspective the distance is measured, (2) on the other user/dataset (to whom the distance is measured), and/or (3) other parameters, such as time and business necessity.

After the step 230, the process may terminate at flow point 299. If the one or more criteria are not met in the decision block 225, the process may terminate at the flow point 299 without performing the action in the step 230. The process may then be repeated for other users or for the same user, for example, when information is dynamically updated.

This document describes in detail the inventive apparatus, methods, and articles of manufacture for making estimations/determinations of relevance, relatedness, and/or affinity of datasets and actions based on the resulting estimates/determinations. This was done for illustration purposes. Neither the specific embodiments of the invention as a whole, nor those of its features necessarily limit the general principles underlying the invention. The specific features described herein may be used in some embodiments, but not in others, without departure from the spirit and scope of the invention as set forth herein. Various physical arrangements of components and various step sequences also fall within the intended scope of the invention. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is carried out by current and future claims and their equivalents.

I claim:

1. An article of manufacture comprising non-volatile machine-readable storage medium with machine-executable program code stored in the medium, the program code comprising instructions for group management of a social network, the social network having a first entity and a plurality of other entities, the first entity and each entity of the plurality of other entities being associated with a plurality of characteristics, the instructions implementing steps comprising:

first assigning a value to each characteristic of the plurality of characteristics of the first entity to obtain a first dataset associated with the first entity, the first dataset comprising the values of the plurality of characteristics of the first entity, wherein the values of at least some of the characteristics of the first entity are based at least in part on information regarding the characteristics of the first entity provided by the first entity;

second assigning a value to each characteristic of the plurality of characteristics of said each entity of the plurality of other entities to obtain a plurality of datasets associated with the plurality of other entities, a dataset of the plurality of datasets per entity of the plurality of other entities, each dataset of the plurality of datasets comprising the values of the characteristics of the entity with which said each dataset is associated, wherein the values of at least some of the characteristics of said each entity of the plurality of other entities are based at least in part on information regarding the characteristics provided by said each entity of the plurality of other entities;

computing for said each entity of the plurality of other entities a distance in a first conceptual space between a point in the first conceptual space defined by the first dataset, and a point in the first conceptual space defined by values of the characteristics of the dataset of said each entity of the plurality of other entities, thereby obtaining a plurality of distances in the first conceptual space, a distance of the plurality of distances corresponding to a different entity of the plurality of other entities, wherein each dimension of the first conceptual space corresponds to a different one of said plurality of characteristics, and wherein distances along at least one of the dimensions in the first conceptual space are weighted by a weight assigned by the first entity to characteristic associated with said at least one of the dimensions; and selecting entities for a first group from the plurality of other entities so that distance in the first conceptual space corresponding to each entity included in the first group is within a first predetermined distance limit.

2. The article of manufacture according to claim 1, wherein the instructions further implement steps comprising: at least one step selected from transmitting to the first entity information about the entities of the first group for inclusion in one or more affinity groups of the first entity, and transmitting to the entities of the first group information about the first entity for inclusion in affinity groups of the entities of the first group.

3. The article of manufacture according to claim 2, wherein:

the instructions are such that the step of first assigning comprises receiving over one or more computer communication networks from the first entity first data from which at least part of the first dataset can be determined, and the step of second assigning comprises receiving over the one or more computer communication networks from a second entity of the plurality of other entities second data from which at least part of the dataset associated with the second entity can be determined; and the one or more computer communication networks comprise a cellular communication network.

4. The article of manufacture according to claim 2, wherein:

the instructions implement the step of first assigning so that the step of first assigning comprises receiving over a computer network from the first entity first data from which at least part of the first dataset can be determined, and the step of second assigning comprises receiving over the computer network from a second entity of the plurality of other entities second data from which at least part of dataset associated with the second entity can be determined; and the computer network comprises the Internet.

5. The article of manufacture according to claim 4, wherein the first conceptual space is a non-Euclidean metric conceptual space.

6. The article of manufacture according to claim 4, wherein the first conceptual space is a Euclidean conceptual space.

7. The article of manufacture according to claim 4, wherein at least one of said plurality of characteristics is a physical characteristic.

8. The article of manufacture according to claim 4, wherein at least one of said plurality of characteristics is a psychological profile characteristic.

9. The article of manufacture according to claim 4, wherein the first conceptual space comprises at least one discrete dimension.

10. The article of manufacture according to claim 4, wherein the first conceptual space comprises at least one contiguous dimension comprising a plurality of intervals.

11. The article of manufacture according to claim 4, wherein the instructions further implement:

computing a second perspective distance for a third entity of the plurality of other entities, by calculating a distance in a second conceptual space between a point in the second conceptual space defined by the first dataset of the first entity, and a point in the second conceptual space defined by dataset corresponding to the third entity of the plurality of other entities, wherein the second conceptual space is defined so that each dimension of the second conceptual space corresponds to a different one of said plurality of characteristics, and wherein distances along at least one of the dimensions in the second conceptual space are weighted by a weight assigned to characteristic associated with said at least one of the dimensions in the second conceptual space by the third entity; and including in a second group the first entity if the second perspective distance is within a second predetermined distance limit in the second conceptual space, the second group being associated with the third entity.

12. The article of manufacture according to claim 4, wherein the instructions are such that at least one of the step of first assigning and the step of second assigning comprises applying a translation algorithm to words signifying importance or affection.

13. The article of manufacture according to claim 4, wherein at least one of the step of first assigning and the step of second assigning is performed at least in part dynamically.

14. A method of providing information to a user about one or more entities of a plurality of entities through an apparatus comprising at least one computing device coupled to a computer network, the user being associated with a plurality of characteristics, and each entity of the plurality of entities being associated with the plurality of characteristics, the method comprising:

assigning by the apparatus a value to each characteristic of the user and said each entity of the plurality of entities to obtain a first dataset associated with the user, the first dataset comprising the values of the characteristics of the user, and a plurality of datasets of the plurality of entities, a dataset of the plurality of datasets per entity of the plurality of entities, each dataset of the plurality of datasets comprising the values of the characteristics of the entity with which said each dataset is associated, the step of assigning being performed for the user based at least on information regarding the characteristics obtained from the user, the step of assigning being performed for said each entity of the plurality of entities based at least on information regarding the characteristics provided about said each entity of the plurality of entities;

computing by the apparatus for said each entity of the plurality of entities a distance in a first conceptual space between a point in the first conceptual space defined by the first dataset, and a point in the first conceptual space defined by values of the characteristics of the dataset of said each entity of the plurality of other entities, thereby obtaining a plurality of distances in the first conceptual space, a distance of the plurality of distances corresponding to a different entity of the plurality of entities, wherein each dimension of the first conceptual space corresponds to a different characteristic of the plurality of characteristics, and wherein distances along at least one of the dimensions in the first conceptual space are weighted by a weight assigned to characteristic associated with said at least one of the dimensions;

selecting by the apparatus one or more entities for a first group from the plurality of entities so that distance in the first conceptual space corresponding to each entity included in the first group is within a first predetermined distance limit; and providing information of potential interest to the user about the one or more entities of the first group.

15. The method of claim 14, wherein the steps of assigning and computing are performed at least in part based on dynamically changing information.

16. The method of claim 15, wherein the dynamically changing information comprises Internet activity of the user.

17. The method of claim 15, wherein the dynamically changing information comprises Internet activity of a person other than the user.

18. The method of claim 15, wherein the dynamically changing information comprises one or more news items.

19. The method of claim 15, wherein the dynamically changing information comprises financial information.

20. The method of claim 15, wherein the information of potential interest to the user comprises an advertisement.

21. A computing apparatus for providing information to a user about one or more entities of a plurality of entities, the user being associated with a plurality of characteristics, and each entity of the plurality of entities being associated with the plurality of characteristics, the apparatus comprising:

at least one processor;

program code storage storing machine-executable instructions, the program code storage being coupled to the at least one processor to enable the processor to read the machine-executable instructions; and a network interface coupling the at least one processor to a computer network;

wherein, when the at least one processor executes the machine-executable instructions, the at least one processor causes the computing apparatus to:

assign a value to each characteristic of the plurality of characteristics of the user and to each characteristic of the plurality of characteristics of said each entity of the plurality of entities to obtain a first dataset associated with the user, the first dataset comprising the values of the characteristics of the user, and a plurality of datasets of the plurality of entities, a dataset of the plurality of datasets per entity of the plurality of entities, each dataset of the plurality of datasets comprising the values of the characteristics of the entity with which said each dataset is associated, wherein the values of the first dataset are assigned based at least in part on information regarding the characteristics obtained from the user, and wherein the values in said each dataset of the plurality of datasets are assigned based at least in part on information regarding the characteristics provided about the entity of the plurality of entities associated with said each dataset;

compute for said each entity of the plurality of entities a distance in a first conceptual space between (1) a point in the first conceptual space defined by the first dataset, and (2) a point in the first conceptual space defined by values of the characteristics of the dataset of said each entity of the plurality of other entities, thereby obtaining a plurality of distances in the first conceptual space, a distance of the plurality of distances corresponding to a different entity of the plurality of entities, wherein each dimension of the first conceptual space corresponds to a different characteristic of the plurality of characteristics, and wherein distances along at least one of the dimensions in the first conceptual space are weighted by a weight assigned to characteristic associated with said at least one of the dimensions;

select by the apparatus one or more entities for a first group from the plurality of entities so that distance in the first conceptual space corresponding to each entity included in the first group is within a first predetermined distance limit; and provide information of potential interest to the user about the one or more entities of the first group.

22. The computing apparatus of claim 21, wherein, when the at least one processor executes the machine-executable instructions, the at least one processor causes the computing apparatus to assign the values and compute the distances at least in part based on dynamically changing information.

23. The computing apparatus of claim 22, wherein the dynamically changing information comprises Internet activity of the user.

24. The computing apparatus of claim 22, wherein the dynamically changing information comprises Internet activity of a person other than the user.

25. The computing apparatus of claim 22, wherein the dynamically changing information comprises one or more news items.

26. The computing apparatus of claim 22, wherein the dynamically changing information comprises financial information.

27. The computing apparatus of claim 22, wherein the information of potential interest to the user comprises an advertisement.

* * * * *